United States Patent
Christophersen (10) Patent No.: US 10,033,665 B2
(45) Date of Patent: Jul. 24, 2018

(54) SYSTEM AND A METHOD OF ANALYSING A PLURALITY OF DATA PACKETS

(71) Applicant: Napatech A/S, Søborg (DK)

(72) Inventor: Jens Christophersen, Virum (DK)

(73) Assignee: Napatech A/S, Søborg (DK)

( * ) Notice: Subject to any disclaimer, the term of this patent is extended or adjusted under 35 U.S.C. 154(b) by 2 days.

(21) Appl. No.: 15/034,252

(22) PCT Filed: Nov. 11, 2014

(86) PCT No.: PCT/EP2014/074231
§ 371 (c)(1),
(2) Date: May 4, 2016

(87) PCT Pub. No.: WO2015/071241
PCT Pub. Date: May 21, 2015

(65) Prior Publication Data
US 2016/0277322 A1    Sep. 22, 2016

(30) Foreign Application Priority Data

Nov. 13, 2013   (EP) ..................................... 13192608

(51) Int. Cl.
*H04L 12/28*    (2006.01)
*H04L 12/935*   (2013.01)
(Continued)

(52) U.S. Cl.
CPC .......... *H04L 49/3036* (2013.01); *H04L 45/74* (2013.01); *H04L 49/00* (2013.01); *H04L 49/9078* (2013.01)

(58) Field of Classification Search
CPC . H04L 49/3036; H04L 49/9078; H04L 45/74; H04L 49/00
See application file for complete search history.

(56) References Cited

U.S. PATENT DOCUMENTS 5,541,920 A    7/1996  Angle et al.
6,954,798 B2   10/2005  Eastham
(Continued)

FOREIGN PATENT DOCUMENTS

WO    WO03075520    9/2003
WO    WO2011032954   3/2011

*Primary Examiner* — Afshawn M Towfighi
(74) *Attorney, Agent, or Firm* — McHale & Slavin, P.A.

(57) ABSTRACT

A system and a method for analyzing a plurality of data packets where the data packets are analyzed to determine which of a number of subsequent process(es) is/are to further analyze the data packets. Information identifying the subsequent process(es) is added to a FIFO. An unknown data packet type is not immediately recognizable, whereby a storage location is reserved in the FIFO, and the data packet is fed to a separate characterizing process deriving the information relating to the relevant process(es), which information is subsequently fed to the relevant storage location in the FIFO, so that the order of data packets represented in the FIFO is the order of receipt of the data packets. From the FIFO, information is fed to a work list or storage of the relevant subsequent processes to process the pertaining data packets. This processing may also be in the chronological order of receipt of the data packets.

20 Claims, 1 Drawing Sheet

(51) Int. Cl.
*H04L 12/931* (2013.01)
*H04L 12/741* (2013.01)
*H04L 12/861* (2013.01)

(56) References Cited

U.S. PATENT DOCUMENTS

| | | |
|---|---|---|
| 8,054,744 B1 | 11/2011 | Bishara et al. |
| 8,228,908 B2 | 7/2012 | Garner et al. |
| 8,270,413 B2 | 9/2012 | Weill et al. |
| 2007/0121615 A1 | 5/2007 | Weill et al. |
| 2008/0013532 A1* | 1/2008 | Garner ............... H04L 45/00 370/389 |

\* cited by examiner

SYSTEM AND A METHOD OF ANALYSING A PLURALITY OF DATA PACKETS

CROSS REFERENCE TO RELATED APPLICATIONS

This is a national stage filing in accordance with 35 U.S.C. § 371 of PCT/EP2014/074231, filed Nov. 11, 2014, which claims the benefit of the priority of European Patent Application No. 13192608.1, filed Nov. 13, 2013, the contents of each are incorporated herein by reference.

The present invention relates to a system and a method for analysing a plurality of data packets where the data packets or parts thereof are to be forwarded to subsequent processes or users in the order of receipt. The problem of some packets being delayed during analysis and thus potentially being overtaken by others is addressed.

Communications and analysis systems may be seen in e.g. U.S. Pat. No. 5,541,920, U.S. Pat. No. 8,054,744, U.S. Pat. No. 6,954,798, U.S. Pat. No. 8,270,413, US2008/0013532, WO03/075520, US2007/121615, WO2011/032954 and U.S. Pat. No. 8,228,908.

A first aspect of the invention relates to a system comprising:
- a storage,
- a characterizing process,
- a plurality of receiving processes,
- a FIFO comprising a plurality of storage positions, the positions comprising an input storage position and an output storage position,
- a data receiving and analysing element configured to analyse each of a plurality of data packets by:
  - receiving at least part of each data packet and deriving therefrom characterizing information,
  - in an order of receipt of the at least parts of the data packets, reserving, for each data packet, a storage position being the input storage position of the FIFO,
  - for each data packet, determining whether the characterizing information is present in the storage and,
    - if so, deriving corresponding forwarding information and storing the forwarding information in the storage position reserved for the data packet,
    - if not, forwarding the characterizing information and/or at least a part of the data packet to the characterizing process,
- an output element configured to derive, from the output storage position, forwarding information, identify from the forwarding information one or more receiving processes of the plurality of receiving processes and forward information identifying the pertaining data packet to the identified receiving process(es), wherein the characterizing process is configured to derive forwarding information relating to the pertaining data packet and add the derived forwarding information to the pertaining, reserved storage position in the FIFO.

In this respect, a system may be a single piece of hardware, such as a single processor, ASIC, chip, FPGA, printed circuit board, computer, PC, server or the like, or the system may be formed by a number of such pieces, the pieces of hardware communicating with each other using any type of communication bus, cables, standard or the like.

The different processes and the data receiving and analysing element may each be implemented as one or more separate chips/processors/ASICs, FPGAs or the like, or one such chip/processor/ASIC/FPGA or the like may implement multiple of the processes if desired. Naturally, multitasking and multi-core processors are widely used, and the present system is well suited for such environments.

A processor/chip/ASIC/FPGA usually has internal memory, which may be used as a storage also in this respect, or the storage may be provided as a separate storage, which may be positioned close to the processor, such as on the same PCB or board, or more remotely, such as as a part of another element, such as another computer, server or the like, which may be addressed and accessed via any type of network, such as a LAN, WAN, the internet or the like.

The storage may be any type of data storage, digital/analog, optical/electronic/magnetic or the like, such as a RAM, flash, SRAM, DRAM, Dynamic storage and Static storage. The storage may be formed by a single element, such as a single chip/ASIC/FPGA or multiple such elements if desired. The storage preferably is addressable using a single address. It may be desired to distribute the storage to different locations, such as to be close to different processors, whereby the storage may be addressable using URLs or the like.

The characterizing process may be implemented as one or more of the above types of processors/chips and may, for example, be implemented as a pipelined process, where the data packet or a part thereof is processed in a number of pipeline steps in order to result in the deriving of the forwarding information desired. In a pipelined circuit, multiple data packets may be analysed or characterised simultaneously.

Below, the desire to maintain the order of the data packets is described with reference to the receiving and analysing element. The same may be the situation in the characterising process, even though it may be allowed to have the analysis of one data packet overtake that of another, as long as the resulting forwarding information reaches the FIFO in time.

The advantage of reserving the storage position for the data packet is that the order of processing of the data packets is thereafter not critical. In fact, not only is overtaking of data packet analysis in a characterizing process then acceptable, multiple characterizing processes may be used. In one situation, different characterizing processes are provided for characterizing different types of data packets. Thus, the receiving/analysing element may determine which of a number of characterizing processes to forward the characterizing information to in order to have the data packet analysed and the forwarding information derived.

The area of data packet analysis is widely known, and the analysis may be focused on any part of the data packet, usually the header thereof, such as the determination of a flow to which the data packet belongs, a type of encapsulation of the data packet, the transmitter/receiver thereof or the like. The present invention is in no way limited in the type of analysis and the type of data of the data packet which forms the basis of the determination of the forwarding information. Data analysis types may be seen in WO2011/032954.

The forwarding information is information identifying the receiving process or processes to receive and/or analyse the data packet in question. This forwarding information may directly identify the process(es) and/or it may comprise information from which such process(es) may be identified. This information may be as simple as a number, an address or other ID, such as an IP address.

As mentioned, the receiving processes receive information relating to the data packages identified to the receiving processes. The receiving processes may be individual users, so that the data receiving and analysing element operates to divide the data packets to the intended users. However, a number of other, more complex, scenarios are supported, such as where different processes are configured to analyse different types of data packages, so that the data packet analysis aims at forwarding the data packages to the receiving processes configured to handle that type of data package.

Another manner of analysing packets is to receive or analyse packets belonging to the same flow, such as a data transfer and/or a communication (audio transmission, video transmission or the like).

Naturally, also simply an analysis of packets for a certain recipient or from a certain transmitter may be singled out to a given receiving process.

As mentioned, a process may be implemented on any number of processors/chips/ASICs/FPGAs or the like, and one processor/chip/ASIC/FPGA or the like may implement any number of processes.

In the present context, a FIFO is a First In First Out system forming an ordered list of elements, such as storage elements and where the data stored therein is output in the order of introduction therein. The FIFO has an input storage location and an output storage location. The input storage location is the storage location in which new data is fed to the FIFO. The output storage location is the storage location in which the oldest data of the FIFO, the next data to be read out or output, is stored. When a present input storage location receives data or is reserved (which may also be by adding data to the storage location), this location is no longer the input storage location. Another, usually empty, storage location is then denoted the input storage location.

When the output storage position is read, it may be emptied/deleted or otherwise freed and thus be able to be re-used. Thereafter, the, now, oldest storage location is the next output storage position. As mentioned, the same address may be the output storage position when the data in the storage positions is shifted from the input storage location to the output storage location. Alternatively, the data remains in the respective locations and the actual location denoted the input storage location and the output storage location may shift.

A particularly desired ability of the present FIFO is that of allowing updating of information or the adding of information in positions between the input storage location and the output storage location.

A FIFO may be implemented in a number of manners, and the actual manner is not important as long as the operation thereof, the maintaining of the order, is maintained. The implementation may be a sequence of memory locations in a storage, for example, a linked list or any of a large variety of other implementations. The data in the FIFO may be shifted through a sequence of data storage positions from an input storage location to an output storage location, so that the number of storage locations in the FIFO (the length of the FIFO) is constant. Alternatively, the data may be stored in any manner or order in a storage, where the input storage location may be an un-used storage location at one end of the list, and where the order of the data is noted so that the next (oldest) data to be output or read—the output storage location—is known. The next write position and the storage position of the next location to be read out may be pointed to by pointers which are subsequently shifted to a next storage position when a new storage position is written to or reserved and when a storage position has been read out and thereby freed.

The number of storage locations between the input storage location and the output storage location may be selected in any desired manner. The more storage locations, the longer the delay between receipt/analysis of the data packet and until the process receives the identification of the data packet. If, however, the number of storage locations is too small, the characterizing process may not have time to process the data packet and revert to the particular data storage location in the FIFO, before that part of the FIFO has been read out.

Presently, the number of data storage positions in the FIFO preferably is more than 1000, such as more than 4000, such as more than 8000, such as more than 12000, such as more than 24000, such as 32000 or more, such as more than 48000.

The FIFO may be implemented with a fixed number of storage positions, such as in the form of a delay line, or with a varying number of storage locations.

As mentioned above, the data receiving and analysing element may be implemented as or on a single processor/chip/ASIC/FPGA/pc/computer/server, or it may be distributed over a number of such elements.

The data receiving may be a standard data receiving on any type of data connection/link/trunk or the like. This receiving may be on the basis of any type of signal, optical, electrical, electromagnetical, magnetic or the like, and on the basis of any standard, such as Ethernet, SONET, Fiber Channel, InfiniBand or the like.

The receiving and analysing element may perform a standard error check, such as a parity bit check, in order to ensure that the data packet received is complete. Also, the receipt of the data packet may comprise other pre-processing, such as a protocol check identifying a protocol to which the data packet conforms and/or a determination that the data packet does not conform to a known or desired protocol.

The analysis of the receiving and analysing element usually is performed by deriving predetermined parts of the data packet, such as from a header thereof, when the data packet comprises a header and a payload, such as is the case for e.g. Ethernet packets.

The interesting parts of a data packet may be a receiver and/or a transmitter address, such as a MAC address and/or an IP address, but also encapsulation types, flow information, packet types (TCP, UDP, for example) and the like may be of interest.

The derived parts may be combined to form characterizing data which may be used for searching in the storage. This combination may be a simple combination or the adding of the data derived into a predetermined function, such as a hash function, in order to derive a single value from the derived parts.

Thus, the characterizing information preferably is, or may be seen as, a single value. It is desired that different interesting characteristics give different characterizing information. This type of characterizing of data packets and the deriving of characterizing information is standard in the field.

The determination of whether the characterizing information is known, whereby the type of data packet is known, may be obtained by searching in a list of known characteristics in the storage.

The storage preferably comprises a plurality of pairs of characterizing information and pertaining forwarding information from which a user may be identified which is to receive and/or analyse at least part of the data packet.

The characterizing information may be used for (directly or as a basis of the calculation of) a key or address in the storage in which the forwarding information may be stored. Thus, in this situation, the characterizing information is present in the storage when forwarding information is present at an address corresponding to or derivable from the characterizing information.

In other situations, pairs of characterizing information and forwarding information may be stored in the storage where such pairs are identified in any other suitable manner.

The searching in the storage may be performed in any desired manner and usually will depend on the manner of storing the data therein. The search may be linear or more intelligent, such as a Hash-lookup, and may depend on whether the data therein is merely stored in a list or whether the data stored therein is ordered, such as in an ordered list, a tree structure or the like.

In one embodiment, the storage is implemented as a CAM, whereby searching may be facilitated.

It is desired that the utilization of, i.e. the storage of data in or the reserving of, storage locations in the FIFO is performed in the same order as the receipt of the data packets.

In one situation, it is preferred that the receiving and analysing element does not allow overtaking of data packets. Then, the reservation is only required for the data packets which are to be analysed by the characterizing process.

This may be obtained by the receiving and analysing element performing the full operation, i.e. the receiving of a data packet, the deriving of the characterising information, the determination and the subsequent deriving of forwarding information and storage of information in the FIFO (which then is a reservation of the storage location) or the forwarding of the characterising information to the characterising process and the reservation of a storage location in the FIFO, before receiving the next data packet.

Naturally, the receiving and analysing element may be pipelined so that a packet sequentially is exposed to or handled by a number different parts thereof and/or different processes from receipt to the deriving of the characterising information to the storing or information in the FIFO or the reserving of a storage location therein. The dividing of the receiving and analysing element into these parts or processes may be selected in accordance with a number of different design parameters.

Thus, one data packet may be handled in one part while a later data packet is handled in an earlier part/process of the receiving and analysing element. Thus, even though each data packet is handled in a sequence of steps/parts/processes, a plurality of data packets may be handled simultaneously.

Then the dividing of the receiving and analysing element into the steps/parts/processes may be decided upon on the basis of e.g. the desired maximum receipt bandwidth, the time duration required by the different parts/processes/steps per data packet. If a part/process/step takes a too long time, it may be divided into smaller parts/steps/processes in order to increase the throughput.

As mentioned above, if the characterizing information is found in the storage, the pertaining forwarding information is stored in the FIFO and thus in the input storage position thereof, whereby an additional storage position of the FIFO is taken up.

Alternatively, the storage position may be reserved initially, where after also overtaking and delays may be allowed in the receiving/analysing element, such as in situations where this has multiple analysing engines which may analyse received data packets with different speeds.

Naturally, the information stored in the FIFO need not be identical to that derived from the storage. What is relevant is that the user/receiving process identifiable from the forwarding information derived from the storage may also be identified from the information stored in the FIFO.

It is noted that a data packet may have multiple interesting characteristics. This may be realised by the receiving and analysing element which may then derive characterising information relating to all such characteristics, whereby the forwarding information derived from the storage may relate to one user/receiving process configured to handle these characteristics or the forwarding information may identify multiple users/receiving processes each configured to handle one or more of the characteristics.

Alternatively, the receiving and analysing element may derive multiple sets of characterising information which each is sought for in the storage and for which, individually, a storage location in the FIFO is either added data or is reserved to be later completed. In this latter situation, the individual forwarding information for each storage location may relate only to one user/receiving process, but a combination is possible where the forwarding information of a storage location may identify multiple users/receiving processes.

It is noted that the information added to the input storage location of the FIFO may comprise further information, such as a storage location or address of the pertaining data packet or a part thereof. This is described further below. Additional information which may be added to the storage location is the characterizing information. This may be desired by the subsequent process and in that manner, the subsequent process needs not derive this information again.

If the characterizing information is not found in the storage, the characterising information and/or at least a part of the data packet is forwarded to the characterising process, which, if not receiving the characterizing information then preferably performs the same deriving of the characterizing information and thereafter determines the user(s)/receiving process(es) to receive and/or further analyse the data packet.

In one embodiment, the characterizing process may derive a new type of characterization, such as another manner of deriving characterizing information, derive the characterizing information and the forwarding information on that basis and subsequently instruct the receiving and analysing element to perform this new type of characterisation. This may be the situation if the new data packet gives rise to a new characterization taking into account this type of or contents in the data packet.

A different type of characterization may be the use of a type of contents, such as a header field, which has not hitherto been used in the characterization, a new type of encapsulation, a new type of flow or the like. This may be realized by the characterizing process, utilized thereby and then pushed to the receiving and analysing element for future use. Alternatively, the characterizing process may be configured to request input from a user/operator when encountering e.g. unknown or un-recognized characteristics types and to receive analysis instruction from a user/operator, implement these to solve future characterizations of that type—and instruct the receiving and analysing element accordingly.

The reserving of the input storage position simply means that this storage position is now taken up, as in the case where meaningful information or data was stored therein. A reserved storage location may be empty or be filled with information which is later replaced, if desired. Also, as is mentioned below, a storage position may comprise multiple types of data, some of which may be added from the start and some which may be received subsequently from the characterizing process, for example.

The characterizing process derives the forwarding information relating to the pertaining data packets. As mentioned above, the characterizing process may be pipelined, and even though it is preferred that the forwarding information derived is output in the order of receiving the characterising information/data packets and thus the order of receipt thereof in the receiving and analysing element, overtaking may be allowed as long as the forwarding information reaches the FIFO before reading out of the pertaining storage location.

In addition, multiple characterizing processes may be provided. In one situation, different characterizing processes are configured to analyse different types of data packets, so that the receiving/analysing element will forward the characterizing information to a selected characterizing process able to handle the pertaining type of data packet.

Naturally, when forwarding information is derived from characterizing information, this forwarding information is preferably stored in the storage so as to be present there next time the same characterizing information is derived, such as when a data packet from the same flow is received.

The output element may form part of any type of hardware also implementing e.g. the receiving and analysing element or may be configured as a separate piece of hardware.

The output element will derive the information from the output storage position of the FIFO and therefrom identify one or more receiving processes/users which are to receive and/or analyse the data packet further. This receiving process/user or these receiving processes/users receive(s) information identifying the data packet. This information may be the data packet itself, a part thereof or information from which the data packet or a part thereof may be accessed, such as an address thereof in an accessible storage.

When reading the contents of the output storage position of the FIFO, this storage position now may be released and the storage position of the, now, oldest data in the FIFO may be denoted the output storage position. In the situation where the data in the FIFO is shifted between memory addresses in a storage, the same memory address may hold the output storage position information and thus the next data to be output.

In one embodiment, the receiving/analysing element maintains knowledge of the total number of used data storage positions in the FIFO in order to know the overall time delay of data through the FIFO. This number of positions or the time delay may be compared to a minimum number or a minimum delay required by the characterizing process in order to process/characterize an unknown data packet and revert with the forwarding information to the receiving/analysing element and/or the FIFO.

If the number or delay is lower than a predetermined threshold, the receiving and analysing element may add, to the FIFO, one or more empty storage locations or may add to a storage location information indicating to the output element that this information is not related to a data packet and/or that this information is not to be forwarded to a process. In addition, this information may indicate a period of time which is to be awaited before reading the next information from the FIFO. Then, the output element may be configured to, when encountering such information, either await the next deriving of information from the FIFO for a period of time indicated in the information, or a pre-programmed period of time. It is preferred that a storage position is not read, before it has been completed with the pertaining characterizing information/data.

In another situation, each storage position may have an indication, such as a "ready flag" which may indicate whether the storage position is complete or not. Thus, when the storage position is merely reserved, the indication may be negative, whereas when the forwarding information is provided therein, by the receiving/analysing element or the characterizing element, the indication may be positive. If additional information is also required, the positive indication is only set, once all information is provided therein.

Then, the output element may, when reading an output storage position with a negative indication, simply await reading the information, until the indication is positive and the contents complete.

In one embodiment, at least one of the receiving processes comprises a list comprising information identifying data packets, the at least one receiving process being configured to sequentially process the data packages identified in the list, the output element being configured to forward the information identifying the data packet to the list.

Naturally, the receiving process(es) may be implemented in any desired manner, such as a pipelined manner in which a plurality of data packages may be analysed both sequentially and simultaneously.

The output element may determine the order by adding the pertaining information to a desired position in the list.

Naturally, the receiving process may have multiple lists, such as lists for different priorities. Alternatively, different receiving processes may be implemented for the same analysis/characteristics but for different priorities.

In a preferred embodiment, the list is an ordered list of information identifying data packets, the output element being configured to forward the information identifying the data packet to an end of the ordered list. In this manner, the chronological order of the data packets output from the FIFO and thus, preferably, received by the receiving and analysing element, may be maintained. This is especially relevant when the data packets form a flow to be analysed.

In one embodiment, the data receiving and analysing element is configured to sequentially analyse the data packets and store the forwarding information, if this is identified in the storage, or otherwise reserve the input storage position for a data packet—in the order of receipt of the data packets. As mentioned above, this maintains the chronological order of the data packets, which order is especially desired when at least one of the characteristics on the basis of which data packets (or information identifying these) relate to a flow and where the pertaining process is to analyse this flow.

In one embodiment, the system further comprises a second storage, wherein:
  the data receiving and analysing element is configured to store the data packet or at least a part thereof at a first address, and
  add the first address to the pertaining reserved storage position,
the output element being configured to derive, from the output storage position, also the first address and forward the first address to the identified receiving process. Naturally, this address may be added to the storage position before or after the forwarding information. The adding of the address may be a manner of reserving the storage position.

As mentioned above, the storages may be implemented in any manner desired, combined or distributed, using any technology and separately or combine with any of the other hardware elements.

The second storage may comprise a plurality of addressable storage locations each configured to hold a data package.

Naturally, multiple second storages may be used, such as one second storage for each process/user.

In this embodiment, the data package or the part thereof is stored at an address which is represented in the pertaining storage location in the FIFO from which it may be read out and forwarded to the identified receiving process(es) as the information identifying the data packet or as a part thereof. In this manner, bandwidth is not wasted between the processes for forwarding the whole data packet.

In addition to the first address, other data may be stored in the storage location of the FIFO, such as the characterizing information derived by the receiving and analysing element and/or the characterizing process, as this already has been derived and then, when forwarded to the identified receiving process (es), need not be derived again.

Then, at least one of the receiving processes preferably is configured to, upon receiving the first address, retrieve at least part of the data packet from the first address of the second storage.

A second aspect of the invention relates to a method of analysing a plurality of data packets, the method comprising:

a) receiving at least part of each data packet in a predetermined order,
b) for each data packet and in the order, reserving a storage location being an input storage location in a FIFO having a plurality of storage positions, the input storage position and an output storage position,
c) for each data packet:
   deriving, from the data packet, characterizing information,
   determining whether the characterizing information is present in a storage:
   if so:
      deriving pertaining forwarding information and
      forwarding the forwarding information to the pertaining reserved storage position,
   if not:
      forwarding the characterizing information and/or at least a part of the data packet to a characterizing process and
      receiving, from the characterizing process, forwarding information and adding the received forwarding information to the pertaining, reserved storage position in the FIFO and
d) deriving forwarding information from the output end of the FIFO, identifying from the forwarding information one or more receiving processes of a plurality of receiving processes and forwarding information identifying the pertaining data packet to the identified receiving process(es).

As indicated above, the method may be performed by/on a single processor/ASIC/FPGA, software controlled, hardwired or a combination thereof, or a number of such elements configured to communicate with each other.

In this context, a plurality of data packets, or at least a part of each data packet, are received over a period of time and are subsequently analysed. As mentioned above, the analysis may be sequential in the respect that no data packet analysis is finalised before the finalising of any earlier received data packet analysis. In that situation, the reservation of the storage position may be performed subsequent to the analysis. The analysis may be pipelined if desired.

Alternatively, the storage position may be reserved upon receipt of the data packet or a part thereof, where after lower demands may be put on the timing of the analysis.

The receipt may comprise a data integrity check and other desired pre-analysis to ensure that the data packet is complete and error free.

The deriving of the characteristics information from the data packet, as is described further above, may relate to any part of the data packet, such as from header fields of the data packet when conforming to a standard such as the Internet standard.

The characterizing information may be information derived from the relevant fields or parts of the data packet or other information derived. This information may be post processed, such as using a hashing routine, to generate a single value which is used as the characterizing information and used as the search key (typically an address) in the search in the storage.

The search in the storage may be performed in any desired manner. The result may be that no corresponding information is identified in the storage, whereby the packet is to be characterised separately.

If the corresponding information is identified in the storage, pertaining forwarding information is derived from the storage and fed to the pertaining, reserved storage position in the FIFO. Preferably, pairs of forwarding information and characterizing information is stored in the storage.

Usual tidying up of the storage may be performed where old or timed-out pairs are removed, so that the storage is not filled with un-used data.

The operation of the FIFO comprises: new data is added to the input end thereof and the oldest data thereof is read out. No data younger than the oldest data is removed from the FIFO; only the oldest storage position or address in the FIFO is freed. Updating of storage locations between the input and output storage locations, though, is possible in the present FIFO.

The FIFO has a number (varying or constant) of storage locations of which one always is the input storage location for receiving the next data in the FIFO and one is the output storage location holding the next (oldest) data to be read out. The FIFO may be implemented in a storage in a number of storage addresses, where one storage location is in one address. The FIFO may be implemented so that the same storage location is at the same address, and the data may remain in the same storage location, from its being the input storage location to its being the output storage location. In another implementation, the one address may always be the input storage location and another address may constantly be the output storage location, where the data is shifted along the data locations from the input storage location to the output storage location.

If the characterising information is not identified or recognised in the storage, the characterizing process is instructed to characterize the data packet. This characterization may be performed independently of and/or separately from the operation of the receiving and analysis, so that the receipt/analysis may continue receiving and analysing other data packets while the characterising process characterises or analyses this data packet.

In order to ensure the order of the data in the FIFO, the input storage position is reserved, whereby, as information is added and removed from the FIFO, this storage position or the data moves toward the output storage position.

The reserving may be, as it mentioned above, adding of no information, the adding of un-important information or the adding of other information, such as a unique identifier, relating to the data packet. Later, this storage position is updated with the forwarding information when derived by the characterising process.

The characterizing process may have parallel tracks analysing different data packets if desired.

When new forwarding information has been derived, it may be stored in the storage for later use.

Finally, the forwarding information is derived from the output storage position of the FIFO, so that this position is released, and one or more of the receiving processes are identified from the forwarding information. Then, information identifying the pertaining data packet is fed to the receiving process(es). This information may be the data packet, a part thereof, a storage address thereof or other information allowing the receiving process(es) to gain access to the data packet or at least a part thereof.

As mentioned above, further information may be added to the storage position of the FIFO, such as the characterizing information. This additional information may also be fed to the receiving process(es).

Naturally, the forwarding information may identify the receiving process(es) in any desired manner. The receiving processes may be identified by the setting of individual bits in a bit pattern, as numbers in a set of numbers, or the like. The forwarding information may directly identify the receiving process(es) or a table may be provided converting a value provided as the forwarding information and the identity or addresses of the receiving process(es).

In one embodiment, at least one of the receiving processes maintains a list comprising information identifying data packets, the at least one receiving process sequentially (in the order—of receipt) processing the data packages identified in the list, step d) comprising forwarding the information identifying the data packet to the list.

This order may be determined by the manner in which the information is fed into the list in step d). Different lists for different priorities may be uses, as is described further above.

In a preferred embodiment, the list is an ordered list of information identifying data packets, the output element forwarding the information identifying the data packet to an end of the ordered list.

In one embodiment:
- step a) comprises storing the data packet or at least a part thereof at a first address in a second storage,
- step b) or step c) comprises adding the first address to the pertaining reserved storage position, and
- step d) comprises deriving the first address from the output storage position and forwarding the first address to the identified receiving process.

Then, at least one of the receiving processes, upon receiving the information identifying the data packet and the first address, may retrieve at least part of the data packet from the first address of the second storage.

In the following, preferred embodiments will be described with reference to the drawing, which illustrates the most relevant parts of an embodiment of the invention.

Figure 1:
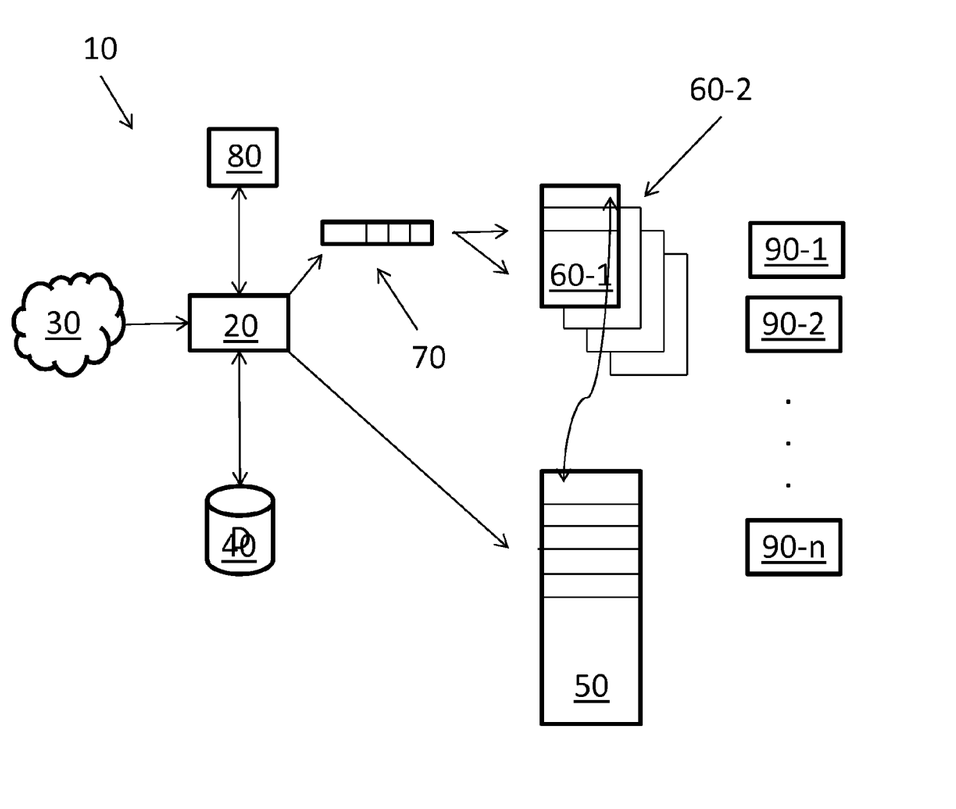

FIG. 1 illustrates a system 10 having a processor 20 receiving packets from a network 30, such as the WWW, and forwards this to one of a number of receiving processes or users 90 of which the users 90-1, 90-2 and 90-*n* have been illustrated. The receiving processes or users 90 may be separate pieces of hardware, such as different client computers, or may be implemented on fewer processors a multiple processor network, or even on or as a single processor if desired.

The processor 20 forwards the data packet to a storage or queue 50 and derives characterizing information as to a flow, a receiving process/user 90, or the like to which each packet belongs. This is obtained by deriving characteristic data, such as receiver-ID, transmitter-ID, encapsulation etc. and using this information, perhaps after a hashing or the like, as a key into the storage or database 40 in which pairs of such search information and a user ID and/or a work list ID are stored.

Thus, each user or receiving process 90 may receive data packets having only some of the many characteristics which data packets may have. One characteristic may be the belonging to a certain flow, a certain receiving entity, address or the like, a certain type of encapsulation, or the like. The users or processes thus may be especially adapted to further analyse such types of data packages.

If the data packet characteristic is found in the database 40, the search will identify a pair and thus a work list ID or a user ID of the user 90 to which the packet is intended or which is to receive the packet. This ID information is fed into a FIFO 70. Naturally, this ID information may identify multiple users or work lists if desired. This ID information may be represented in any manner, as long as the ID is derivable therefrom.

Together with the ID information, a pointer or address is added to the storage position in the storage 50 where the data packet or at least a part thereof is stored.

In the drawing, a number of work lists 60 are illustrated, two of which are denoted 60-1 and 60-2. Each work list 60 holds a list of storage positions each representing a data packet to be received or handled by a user/process 90. The work list 60 preferably holds information in a sequence corresponding to the order or receipt of the processor 20 of the packets represented in the work list 60. The user/process 90 then may analyse or receive the packets in that order and at its own speed.

Thus, the queue 50 may be shared by all users/processes 90 but each user/process 90 has its own work list 60. Alternatively, one or more users/processes 90 has a number of work lists, such as for different priorities or packet/data types.

Another alternative is to provide a queue 50 for each user 90. In that situation, the queue 50 may be local to the user 90 so as to be easily accessed thereby.

In the situation where the user 90 has not been identified when the data packet is to be stored, the data packet may be stored in a common storage and subsequently moved to the correct storage 50, when the user 90 has been determined.

If the processor 20 derives characteristics for which a corresponding ID information is not found in the database 40, the processor 20 will request such ID information from a characterizing processor 80 and will thus "outsource" such work. The characterizing processor 80 either receives the data packet, the characterizing data, or the storage position of the data packet in the queue 50 and reverts, at a later point in time, with the derived ID information.

A number of different data flows are possible, and the processor 20 may be involved in this or not, but the result is that the data packet, or at least a part thereof, is again stored in the queue 50 and the resulting ID information (and address data) is provided in the correct position in the FIFO.

In order to ensure that the ID information is added to the FIFO 70 at the correct chronological position, an address space may be reserved for this entry in the FIFO 70 at the time where the characterizing processor 80 is instructed to characterize the data packet. In one situation, this space is partly completed with the storage position of the data packet in the queue 50. Alternatively, this address may be forwarded to the processor 80 which then adds this to the data for the FIFO 70.

Alternatively, the address space may be reserved for all data packets received—before or after analysis, so that the timing of the analysis thereof in the processor 20 and/or in the processor 80 is less critical, as the reservation in itself will maintain the order of the information in the FIFO.

Thus, multiple processors 80 may be used, and the analysis of one data packet may overtake that of another in the processors 20/80.

The FIFO 70 may be updated directly by the processor 80 (which may then receive information as to which address the updating relates) and/or the processor 20.

Also, the database 40 is updated with the new pair of the characterizing data and the newly derived ID information, so that future packets received belonging to the same flow will be recognized. This may be performed via the processor 20 or not.

The operation of the FIFO is to ensure the chronological order of the data packets between receipt of the processor 20 and to representing in the work lists 60. This deriving of the ID information relating to the new data packet will take some time, and in the meantime, it is not known to which work list to forward the ID information. Therefore, the ID information to be forwarded to the work lists is delayed by transmission through the FIFO. Thus, when the unknown packet is received, an incomplete slot is generated in the FIFO, and as this slot is transmitted through the FIFO, the ID information is derived and fed into the FIFO so that when this slot is to be read, it has been completed, and from this data, the work list number may be derived, so that the data may be fed to the correct work list while maintaining the chronological order of the data.

Above, different manners are described of ensuring that incomplete slots in the FIFO 70 are not read out. A simple manner is to provide, in each slot, an indication, such as a flag, which is negative or has one value, before the contents of the slot is complete, and is positive or has another value, when the contents are complete.

An incomplete slot may be a reserved slot, such as a slot comprising merely an identification of the data packet, an address thereof in the storage 50, the worklist ID only, or the like. Thus, the processor 20 and/or the processor 80 may be able to not only add information to the slot but also check the completeness of the data therein and thus set the flag to the correct setting.

As mentioned above, all elements of this apparatus or system may be embodied in any manner of hardware, such as processors, hardwired or software controlled, and optional input/output units for receiving the data packets from the network 30. Each element 20, 40, 50, 60, 70, 80, 90 may be embodied by a single processor or unit, or one processor/unit may embody multiple such elements. The databases 40/70/80 may be held in separate or common/shared storage components external to and/or internal in the processors as desired.

Any type of data communication may be used between the elements and the network, such as Ethernet, wired, wireless or a combination thereof. The skilled person will know that MACs and the like are desired in order to facilitate data transport over wires, and between individual processors when provided in e.g. different positions or places.

The invention claimed is:
1. A system comprising:
 a storage,
 a characterizing process,
 a plurality of receiving processes,
 a FIFO comprising a plurality of storage positions, the positions comprising an input storage position and an output storage position,
 a data receiving and analyzing element configured to analyze each of a plurality of data packets by:
  receiving at least part of each data packet and deriving therefrom characterizing information,
  in an order of receipt of the at least parts of the data packets, reserving, for each data packet, a storage position being the input storage position of the FIFO,
  for each data packet, determining whether the characterizing information is present in the storage and,
  if so, deriving corresponding forwarding information and storing the forwarding information in the storage position reserved for the data packet,
  if not, forwarding the characterizing information and/or at least a part of the data packet to the characterizing process,
 an output element configured to derive, from the output storage position, forwarding information, identify from the forwarding information one or more receiving processes of the plurality of receiving processes and forward information identifying the pertaining data packet to the identified process(es),
 wherein the characterizing process is configured to derive forwarding information relating to the pertaining data packet and add the derived forwarding information to the pertaining, reserved storage position in the FIFO.

2. The system according to claim 1, wherein at least one of the receiving processes comprises a list comprising information identifying data packets, the at least one receiving process being configured to sequentially process the data packages identified in the list, the output element being configured to forward the information identifying the data packet to the list.

3. The system according to claim 2, wherein the list is an ordered list of information identifying data packets, the output element being configured to forward the information identifying the data packet to an end of the ordered list.

4. The system according to claim 1, wherein the data receiving and analyzing element is configured to store the forwarding information or reserve the input storage position for a data packet in order of receipt of the data packets.

5. The system according to claim 1, the system further comprising a second storage, wherein:
 the data receiving and analyzing element is configured to store the data packet or at least a part thereof at a first address, and
 add the first address to the pertaining reserved storage position,
 the output element being configured to derive, from the output storage position, also the first address and forward the first address to the identified receiving process.

6. The system according to claim 5, wherein at least one of the receiving processes is configured to, upon receiving the information identifying the data packet and the first address, retrieve at least part of the data packet from the first address of the second storage.

7. A method of analyzing a plurality of data packets, the method comprising:
 a) receiving at least part of each data packet in a predetermined order,
 b) for each data packet and in the order, reserving a storage location being an input storage location in a FIFO having a plurality of storage positions, the input storage position and an output storage position, c) for each data packet:
   deriving, from the data packet, characterizing information,
   determining whether the characterizing information is present in a storage:
   if so:
      deriving pertaining forwarding information and
      forwarding the forwarding information to the pertaining reserved storage position,
   if not:
      forwarding the characterizing information and/or at least a part of the data packet to a characterizing process and
      receiving, from the characterizing process, forwarding information and adding the received forwarding information to the pertaining, reserved storage position in the FIFO and
d) deriving forwarding information from the output end of the FIFO, identifying from the forwarding information one or more receiving processes of a plurality of receiving processes and forwarding information identifying the pertaining data packet to the identified receiving process(es).

8. The method according to claim 7, wherein at least one of the processes maintains a list comprising information identifying data packets, the at least one process sequentially processing the data packages identified in the list, step d) comprising forwarding the information identifying the data packet to the list.

9. The method according to claim 8, wherein the list is an ordered list of information identifying data packets, the output element forwarding the information identifying the data packet to an end of the ordered list.

10. The method according to claim 7, wherein:
step a) comprises storing the data packet or at least a part thereof at a first address in a second storage,
step b) or step c) comprises adding the first address to the pertaining reserved storage position, and
step d) comprises deriving the first address from the output storage position and forwarding the first address to the identified receiving process.

11. The method according to claim 10, wherein at least one of the receiving processes, upon receiving the information identifying the data packet and the first address, retrieves at least part of the data packet from the first address of the second storage.

12. The system according to claim 2, wherein the data receiving and analyzing element is configured to store the forwarding information or reserve the input storage position for a data packet in order of receipt of the data packets.

13. The system according to claim 3, wherein the data receiving and analyzing element is configured to store the forwarding information or reserve the input storage position for a data packet in order of receipt of the data packets.

14. The system according to claim 2, the system further comprising a second storage, wherein:
the data receiving and analyzing element is configured to store the data packet or at least a part thereof at a first address, and
add the first address to the pertaining reserved storage position,
the output element being configured to derive, from the output storage position, also the first address and forward the first address to the identified receiving process.

15. The system according to claim 3, the system further comprising a second storage, wherein:
the data receiving and analyzing element is configured to store the data packet or at least a part thereof at a first address, and
add the first address to the pertaining reserved storage position,
the output element being configured to derive, from the output storage position, also the first address and forward the first address to the identified receiving process.

16. The system according to claim 4, the system further comprising a second storage, wherein:
the data receiving and analyzing element is configured to store the data packet or at least a part thereof at a first address, and
add the first address to the pertaining reserved storage position,
the output element being configured to derive, from the output storage position, also the first address and forward the first address to the identified receiving process.

17. The method according to claim 8, wherein:
step a) comprises storing the data packet or at least a part thereof at a first address in a second storage,
step b) or step c) comprises adding the first address to the pertaining reserved storage position, and
step d) comprises deriving the first address from the output storage position and forwarding the first address to the identified receiving process.

18. The method according to claim 9, wherein:
step a) comprises storing the data packet or at least a part thereof at a first address in a second storage,
step b) or step c) comprises adding the first address to the pertaining reserved storage position, and
step d) comprises deriving the first address from the output storage position and forwarding the first address to the identified receiving process.

19. The method according to claim 17, wherein at least one of the receiving processes, upon receiving the information identifying the data packet and the first address, retrieves at least part of the data packet from the first address of the second storage.

20. A system comprising:
a storage,
a characterizing process,
a plurality of receiving processes,
a FIFO comprising a plurality of storage positions, the positions comprising an input storage position and an output storage position,
a data receiving and analyzing element configured to analyze each of a plurality of data packets by:
   receiving at least part of each data packet and deriving therefrom characterizing information,
   in an order of receipt of the at least parts of the data packets, reserving, for each data packet, a storage position being the input storage position of the FIFO,
   for each data packet, determining whether the characterizing information is present in the storage and,
      if so, deriving corresponding forwarding information and storing the forwarding information in the storage position reserved for the data packet,
      if not, forwarding the characterizing information and/or at least a part of the data packet to the characterizing process,
an output element configured to derive, from the output storage position, forwarding information, identify from the forwarding information one or more receiving processes of the plurality of receiving processes and forward information identifying the pertaining data packet to the identified process(es), wherein the characterizing process is configured to derive forwarding information relating to the pertaining data packet and add the derived forwarding information to the pertaining, reserved storage position in the FIFO, wherein at least one of the receiving processes comprises a list comprising information identifying data packets, the at least one receiving process being configured to sequentially process the data packages identified in the list, the output element being configured to forward the information identifying the data packet to the list, wherein the list is an ordered list of information identifying data packets, the output element being configured to forward the information identifying the data packet to an end of the ordered list.

* * * * *